Figure 1:
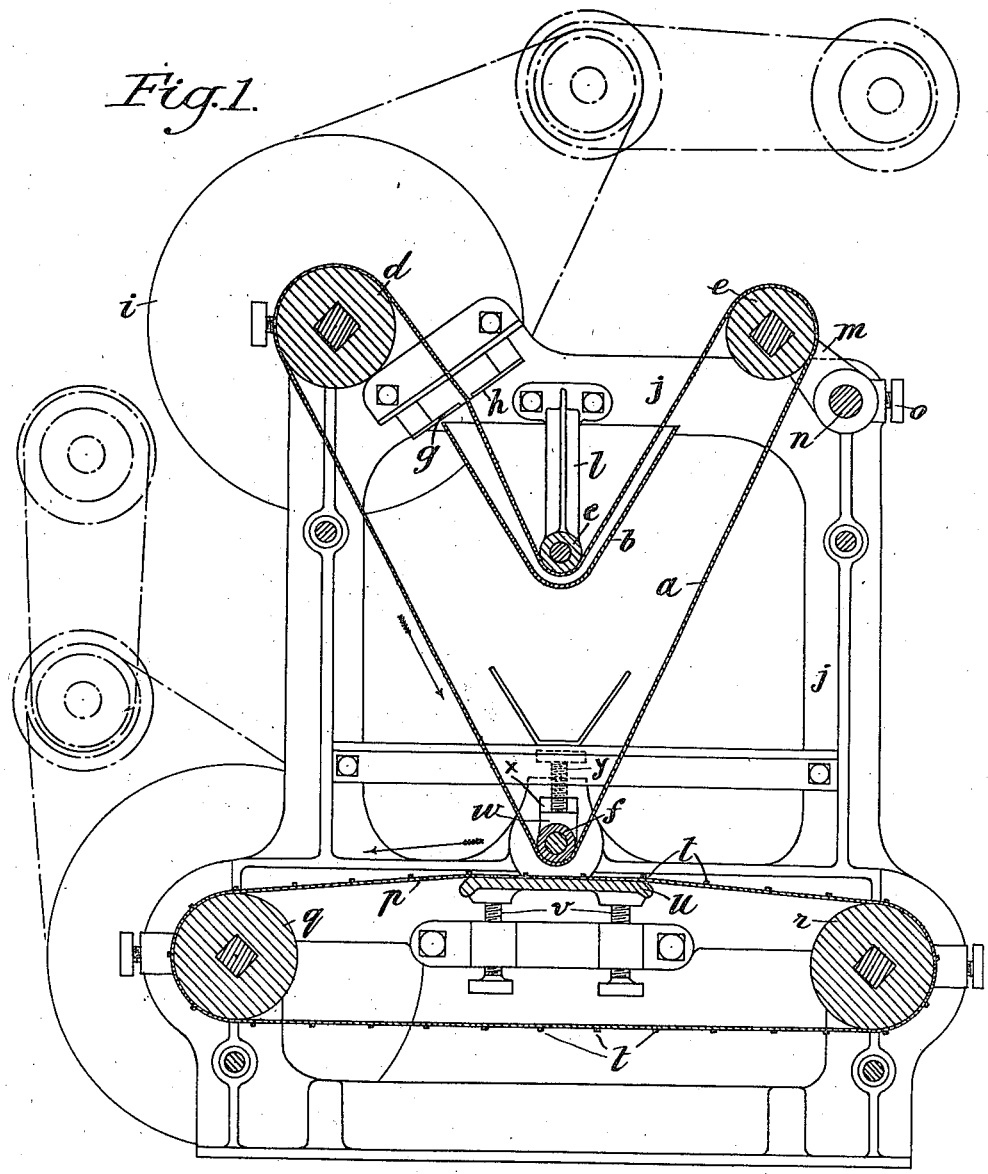

T., J. & E. L. VICARS.
BISCUIT ICING MACHINE.
APPLICATION FILED FEB. 20, 1913.
1,153,585.
Patented Sept. 14, 1915.
2 SHEETS—SHEET 2.
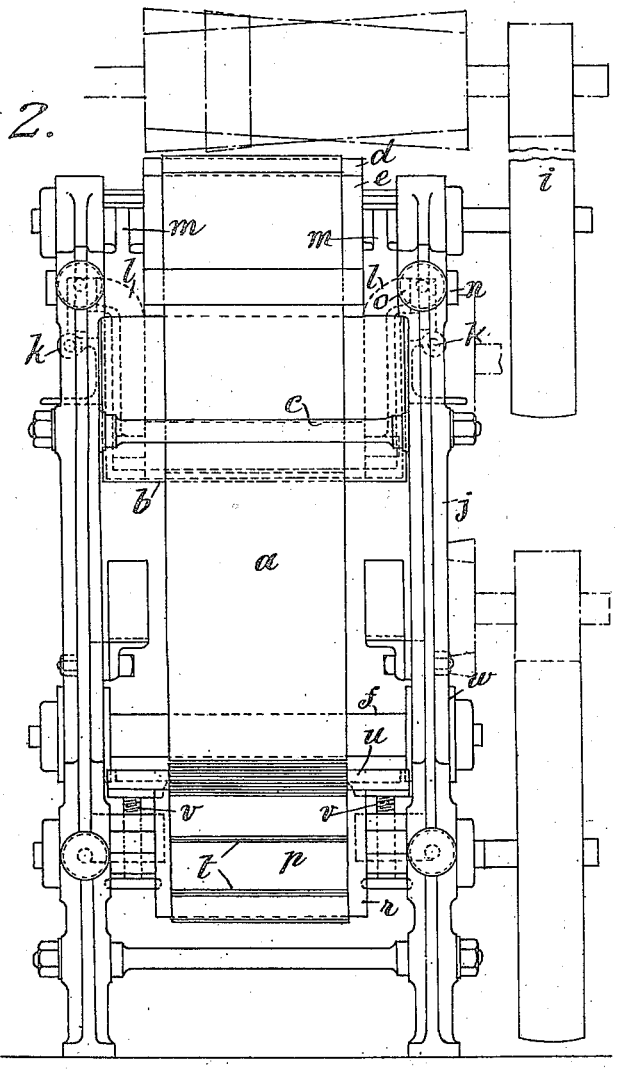
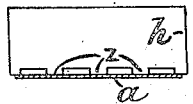

UNITED STATES PATENT OFFICE.

THOMAS VICARS, JOHN VICARS, AND EDWARD LYNTON VICARS, OF EARLESTOWN, ENGLAND.

BISCUIT-ICING MACHINE.

1,153,585. Specification of Letters Patent. Patented Sept. 14, 1915.

Application filed February 20, 1913. Serial No. 749,607.

*To all whom it may concern:*

Be it known that we, THOMAS VICARS, JOHN VICARS, and EDWARD LYNTON VICARS, subjects of the King of Great Britain, residing at Earlestown, in the county of Lancaster, England, have invented new and useful Improvements in Biscuit-Icing Machines, of which the following is a specification.

This invention relates to that kind of machine in which an endless traveling band is used for conveying the icing. Hitherto the speed of these machines has been comparatively slow and the capabilities of varying the quantity of icing on the biscuits very small.

The object of our invention is to provide machines in which the speed may be much increased or varied at will and in which the quantity of icing deposited on the biscuits may be varied as desired.

The invention is hereafter described with reference to the accompanying drawings on which—

Figure 1 is a longitudinal section and Fig. 2 an end view of an icing machine according to our improvements. Fig. 3 is a detail view of the icing gage.

$a$ is an endless traveling band dipping into the icing trough $b$ and passing under a roller $c$ therein and carried outside around rollers $d$, $e$ so arranged that the icing to be deposited is on the lower side of the band when passing around a roller $f$ below the bottom of the trough $b$; any icing adhering to the other side being removed by a scraper $g$ as usual, and a gage $h$ is used to regulate the thickness of icing on the band. This band may be driven by one of the rollers $d$ through a pulley $i$ which may be operated from coned pulleys and belts, as shown in dotted lines, ratchet and pawl gearing, or other convenient variable speed devices so that the speed may be varied to any desired extent.

The icing trough $b$ is supported on the framework $j$ by lugs and pins $k$ so that it may readily be detached for cleaning and refilling. The roller $c$ is supported in position by brackets $l$ from the framework $j$ and the roller $e$ is preferably carried on arms $m$ pivoted at $n$ and secured by screws $o$ so that the tension of the band may be regulated. Underneath the bottom roller $f$ we arrange another endless band $p$ traveling around rollers $q$, $r$, which band carries the biscuits to be iced under the icing band $a$ and this carrier band $p$ may be driven by pulleys from coned pulleys and belts, as shown in dotted lines, ratchet and pawl gearing, or other convenient variable speed devices, so as to vary the speed of the band $p$ to any desired extent. This means of varying the speeds of the icing band and the carrier band allows of regulation of the icing to a very large degree. If the carrier band $p$ is driven at a slow speed and the icing band $a$ at a quick speed in the direction shown by the arrows and the gage $h$ is arranged for a thick layer of icing the biscuits will receive a very thick coating of icing, if the band $p$ is driven fast and the band $a$ slow, and the gage $h$ arranged for a thin layer the biscuits will receive a very thin coating of icing.

The carrier band may be provided with recesses or with projections $t$ to prevent displacement of the biscuits by contact with the icing. The carrier band $p$ or a part of it immediately below the said bottom roller $f$ is arranged to be raised or lowered by a table $u$ adjustable by screws $v$, or by a roller, or other convenient device, according to the thickness of the biscuits and of the icing required on them; or instead of moving the carrier band $p$ the icing band $a$ or part of it might be raised or lowered by moving the roller $f$, which for this purpose may be journaled in bearings $w$ vertically movable in guides $x$ and adjustable by screws $y$. When several lines of biscuits are arranged on the width of the carrier band the icing gage may be so arranged, as shown at $z$ Fig. 3, that the icing is scraped off those parts of the icing band corresponding to the intervals between the lines of biscuits.

We claim,

1. In a biscuit icing machine the combination of an endless traveling icing band passing around a roller and devices for conveying biscuits in an opposite direction underneath that part of the band passing around the roller, the roller being arranged so that the icing band does not parallel to the biscuits, substantially as set forth.

2. In a biscuit icing machine the combination of an endless traveling icing band passing around a roller and an endless traveling biscuit carrier band passing in an opposite direction underneath the icing band around supporting rollers and out of parallelism with respect to the icing band, substantially as set forth.

3. In a biscuit icing machine the combination of an endless traveling icing band passing around a roller, devices for conveying biscuits in an opposite direction underneath that part of the band passing around the roller, whereby the portions of the band branching from the biscuit conveying devices form a contacting portion traversing the conveying devices along a single line across the latter, and devices for varying the distance between the icing band and the conveying devices, substantially as set forth.

4. In a biscuit icing machine the combination of a variable speed endless traveling icing band passing around a roller, said band branching upwardly from said roller, said band and biscuit conveying devices being adjustable toward and away from each other at the point of application of the icing during the operation of the machine, and variable speed devices for conveying biscuits in an opposite direction underneath that part of the band passing around the roller, substantially as set forth.

5. In a biscuit icing machine, a frame, an icing trough supported thereby, a plurality of rollers journaled in said frame above and below said trough, an endless band traveling around said rollers, an additional roller journaled in said trough and beneath which said band passes, rollers journaled in the frame beneath the lower portion of said endless band, a second endless band operating around the last mentioned rollers and having the lower roller around which the aforesaid band operates disposed intermediately and transversely of its upper lap whereby the icing carried by the first mentioned band will be scraped on to the biscuit in passing the latter during the movements of the band.

6. In a biscuit icing machine, a frame, an icing trough supported thereby, a plurality of rollers journaled in said frame above and below said trough, an endless band traveling around said rollers, an additional roller journaled in said trough and beneath which said band passes, means for moving said band at variable speeds, means for scraping the icing from one side thereof while leaving the icing on the other side thereof, the lower portion of the band passing around a single roller, means to adjust said latter roller vertically, a pair of rollers journaled in the frame beneath the last mentioned roller, an endless biscuit conveying band passing around said last mentioned rollers, means for driving said last mentioned band at variable speeds, and in opposite direction to the direction or movement of the first mentioned band whereby variation in the quantity of icing applied to the biscuits may be accomplished and means operative beneath the upper lap of the lower band to adjust the same vertically in coöperation with the adjacent roller and portion of the first mentioned band to vary the distance therebetween.

In testimony whereof we have signed our names to this specification in the presence of two subscribing witnesses.

THOMAS VICARS.
JOHN VICARS.
EDWARD LYNTON VICARS.

Witnesses:
W. B. JOHNSON,
W. ROWBOTTOM.